United States Patent [19]

Gottschalk

[11] 4,274,024

[45] Jun. 16, 1981

[54] SELF-STARTING SYNCHRONOUS MOTOR WITH DEFINED DIRECTION OF ROTATION

[75] Inventor: Detlef Gottschalk, Berlin, Fed. Rep. of Germany

[73] Assignee: Schleicher GmbH & Co. Relais-Werke KG, Berlin, Fed. Rep. of Germany

[21] Appl. No.: 24,993

[22] Filed: Mar. 29, 1979

[30] Foreign Application Priority Data

Jul. 5, 1978 [DE] Fed. Rep. of Germany ....... 2829946

[51] Int. Cl.³ ........................................... H02K 21/12
[52] U.S. Cl. ..................................... 310/162; 310/41; 310/172; 310/164; 310/163
[58] Field of Search .......................... 310/41, 162–165, 310/267, 261, 156, 172, 257

[56] References Cited

U.S. PATENT DOCUMENTS

| | | | |
|---|---|---|---|
| 1,976,880 | 10/1934 | Graseby | 310/41 UX |
| 2,912,609 | 11/1959 | Kassner | 310/267 X |
| 2,951,957 | 9/1960 | Eigeman | 310/164 |
| 3,058,019 | 10/1962 | Eisler | 310/164 |
| 3,454,801 | 7/1969 | Suzuki et al. | 310/41 X |
| 3,502,921 | 3/1970 | Suzuki et al. | 310/172 |
| 3,555,323 | 1/1971 | Gerber | 310/162 |
| 3,737,695 | 6/1973 | Kilmer | 310/164 X |
| 3,808,491 | 4/1974 | Riggs | 310/162 |
| 3,909,647 | 9/1975 | Peterson | 310/267 X |

*Primary Examiner*—Donovan F. Duggan
*Attorney, Agent, or Firm*—Basile, Weintraub & Hanlon

[57] ABSTRACT

Herein disclosed is a self-starting synchronous motor with a defined direction of rotation, a permanent magnetic rotor and a claw-pole type stator. The stator embraces an operating winding where several poles are combined to form main pole groups and to form auxiliary pole groups which are loaded with short circuiting discs. Furthermore, the synchronous motor of this invention has a defined direction of rotation which is not preset by means of a directional blockage. The poles, which are located on a circular ring and protrude from the oppositely located front sides and which interlock, are combined to form two main pole groups and two auxiliary pole groups wherein the total number of main poles is smaller than the total number of auxiliary poles and that from each of both of the frontal sides protrude the same number of main poles and the same number of auxiliary poles.

4 Claims, 4 Drawing Figures

SELF-STARTING SYNCHRONOUS MOTOR WITH DEFINED DIRECTION OF ROTATION

BACKGROUND OF THE INVENTION

I. Field of the Invention

The invention is generally concerned with a synchronous motor and, more specifically, a self-starting synchronous motor having a defined direction of rotation.

II. Description of the Prior Art

A multitude of synchronous mini-motors with direction determining start are known. The rotor of such motors is a polarized, permanent magnet rotor, while the stator, which is of the claw-pole type, is equipped with groups of main poles and auxiliary poles with a number of poles which could be different or the same. These main poles and auxiliary poles are shaped with axially located pole lugs from stator pole sheets which are located on both front sides and, further, the auxiliary poles on each frontal side of the stator are equipped with short-circuit discs. In addition, certain main poles or even auxiliary poles form a magnetic shunt. A known synchronous motor of this type (DE-PS No. 12 93 324) is characterized with reference to the above in such a way that a magnetic shunt is provided at all of the inner pole prongs of the main pole groups of a stator pole sheet such that a reduced magnetic flux is provided at the operating air slots of the main pole groups by means of the formation of this shunt. The number of the main poles of this known synchronous motor equals the number of the auxiliary poles. Since the necessary magnetic flux of the same strength in the main poles and in the auxiliary poles is achieved by means of a reduction of the magnetic flux in the main poles, a part of the generated, magnetic flux is lost and remains inactive for the operation of the synchronous motor. The efficiency of this type of synchronous motor is therefore reduced by at least this amount of the inactive flux of the main pole groups. A compensation effect and a balancing effect which are achieved by means of a shunt will always therefore result in the mentioned reduction of the efficiency of the motor.

There is also known a mini-synchronous motor with permanent magnet rotor and a cage-like, ring-shaped closed stator (DE-AS No. 19 23 586), which in turn is based on the known claw-pole construction and which is equipped with auxiliary poles which are loaded by means of short circuiting discs. This synchronous motor is characterized mainly in such a way that only one group each of main poles and auxiliary poles is provided which are located approximately diametrically opposite each other and which extend approximately over one-half of the stator pole circumference and where the rotor is offset eccentrically towards and in the direction of the auxiliary pole group. This is based on the knowledge that in order to achieve a strong direction determining starting torque, the rotary field must be of such a type that the vectorial recording during one complete cycle of the alternating current, that is, during 360°, should show a circular shape, if possible, due to the eccentric rotor bearing in relation to the main poles and auxiliary poles which are located on a common cylindrical area. Further, an enlarged air slot is given at the main poles and therefore a reduction of the efficiency as a function of the magnitude of the eccentricity is accepted.

Furthermore, a known synchronous motor with a permanent magnetic rotor should also still be mentioned which is self-starting in its direction (DE-AS No. 11 28 546). This type of synchronous motor has a different number of main poles of different polarity such that the number of main poles is smaller than the number of auxiliary poles and wherein the auxiliary poles are shifted in the direction of rotation with reference to the preceding main poles of equal polarity. In case of a specific version, one-half of the stator of the synchronous motor is equipped with six main poles and six auxiliary poles of equal polarity and the other half of the stator with four main poles and six auxiliary poles of opposite polarity. If the problem is solved in such a way that the flux through the auxiliary poles is made equal to the flux through the main poles such that only the number of main poles of one polarity is reduced, this has the disadvantage that the rotor is loaded axially in such a way that it has the tendency to continuously change its axial position with the operating frequency, which results in an unpleasantly high operating noise level which cannot be permitted for a multitude of applications and which also results in the corresponding wear and tear phenomena.

Furthermore, still another synchronous motor of the type which are of interest in this context should be mentioned in which the sum of all main pole lugs of both stator pole sheets equals the sum of all auxiliary pole lugs, and the total number of the stator lugs is smaller than the rotor pole number (DE-PS No. 20 55 470).

In spite of these known individual measures for the improvement of the operating characteristics and/or the efficiency of synchronous motors, the mentioned state of the art shows that the one or other problem could be solved with certain individual measures; however, these solutions always resulted in other disadvantages.

This is the starting point for the present invention which is based on the objective to improve and further develop a self-starting synchronous motor having a defined direction of rotation, a permanent magnetic rotor and a claw-pole type stator in such a way that the efficiency can be optimized with silent operation and that the synchronous motor is characterized by a rapid start and where, in addition, an unambiguous direction of rotation should be preset.

SUMMARY OF THE INVENTION

Herein disclosed is a self-starting synchronous motor with a defined direction of rotation, a permanent magnetic rotor and a claw-pole type stator. The stator embraces an operating winding where several poles are combined to form main pole groups and to form auxiliary pole groups which are loaded with short circuiting discs. Furthermore, the synchronous motor of this invention has a defined direction of rotation which is not preset by means of a directional blockage. The poles, which are located on a circular ring and protrude from the oppositely located front sides and which interlock, are combined to form two main pole groups and two auxiliary pole groups wherein the total number of main poles is smaller than the total number of auxiliary poles and that from each of both of the frontal sides protrude the same number of main poles and the same number of auxiliary poles.

It is advantageous to achieve the necessary balance of the magnetic fluxes in the main poles and in the auxiliary poles in such a way that the number of the main poles is smaller than the total number of the auxiliary poles, that is, for each two main pole groups and two auxiliary pole groups, since torsional vibrations and radial vibrations are avoided and a silent operation characteristic of the synchronous motor results. On the other hand, the efficiency is not reduced by means of this measure since in accordance with the invention the number of the main poles equals the number of the auxiliary poles of different polarity. In this manner the influence of the poles on the rotor during one cycle of the alternating current in an axial direction remains constant in such a way that axial vibrations are also avoided. The arrangement of the poles as it is described results, therefore, in an especially silent synchronous motor at the best possible efficiency.

An especially advantageous choice of dimensions between the width of the poles and the thickness of the poles as well as the circumference of the circle where the poles are located and simultaneously defined relations between the outer diameter and the inner diameter of the rotor results in a fast start which represents, therefore, an especially advantageous operation characteristic of the synchronous motor during the starting phase.

DESCRIPTION OF THE DRAWINGS

The invention will be explained in detail with the aid of the enclosed drawings as follows below; however, it should be noted that the drawings refer only to the versions which are shown in the examples. The following is shown.

DESCRIPTION OF THE PREFERRED EMBODIMENTS

Figure 1:
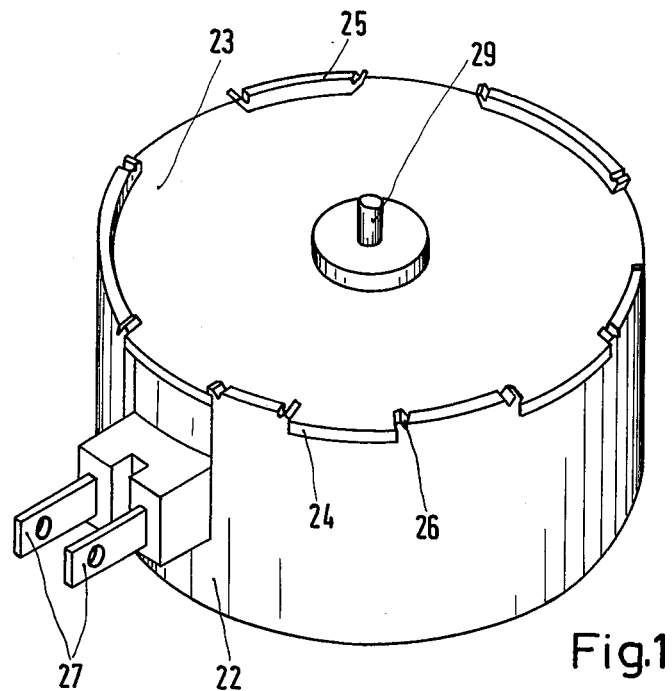
FIG. 1 is a drawing of a perspective view of the assembled housing of the synchronous motor.

FIG. 1 is a perspective view of the present synchronous motor, which is self-starting in one direction of rotation without directional block, in an assembled condition enclosed by a stator 22 and 23, which stator represents the housing. The flat cover 23 which forms a part of the stator is equipped at its peripheral edge with radially protruding extensions 24 at a distance from each other, between which extensions 24 there are located sections which are radially accordingly recessed. In addition, axially protruding extensions 25 are provided on a pot-shaped stator part or housing part 22 which mesh with the above-mentioned recessed sections. The notches 26, which are formed by wedging over, make a permanently connected unit from both of the stator parts 23 and 22. Two connecting lugs 27 are provided for an electrical plug connection with the operating winding.

Figure 2:
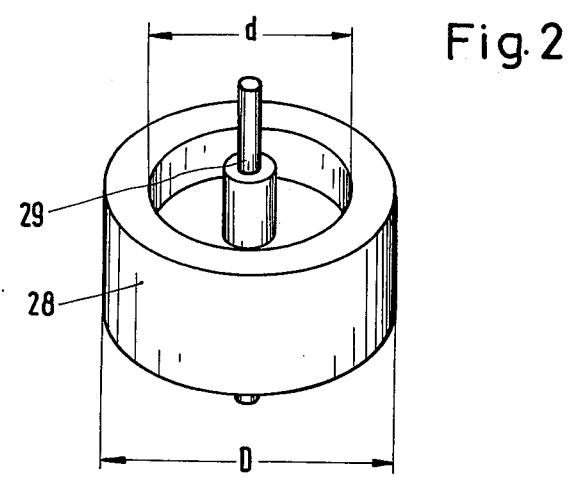
FIG. 2 is a corresponding perspective view of the rotor of the synchronous motor.

The rotor 28, which is guided with its axis 29 in the middle of the stator housing 22 and 23, consists of a ring-shaped permanent magnet, shown in FIG. 2, which permanent magnet has an outer diameter D and an effective inner diameter d. This rotor 28 rotates in the cylindrical space which is formed by the pole lugs, which are shown in FIG. 3 or FIG. 4, respectively.

The synchronous motor, without directional blockage and with a permanent magnetic rotor which is embraced by an operating winding and from the frontal sides of which synchronous motor the poles protrude and extend in an axial direction and which will be described below in more detail, can only then be characterized by an unambiguous direction of rotation, a high torque and a silent operation if the rotary field is of an especially high quality. On the other hand, this quality which is necessary is achieved only then if, in addition to a geometrically correct arrangement of the poles which must correspond with the phase shift of the fluxes in a chronological sense, the fluxes in the main poles and in the auxiliary poles are equal or at least approximately equal. In order to achieve this, the poles are arranged in such a way as it is shown in the cross-sections of FIGS. 3 and 4 for examples of versions of the invention. In case of both examples of versions of the invention as well as in all other conceivable versions, the main common characteristic consists of the fact that always two main pole groups and two auxiliary pole groups are provided where the total number of the main poles is smaller than the total number of the auxiliary poles. In addition, it is a prerequisite for the silent operation that, in case of a smaller number of main poles in comparison to the number of the auxiliary poles, in order to balance their fluxes, the influence of the poles of different polarity on the rotor remain uniform during each alternating current cycle in such a way that none of the axial forces can occur, which would result in corresponding vibrations and which would furthermore therefore result in noisiness of the synchronous motor.

In case of the same number of main poles of different polarity and the same number of auxiliary poles of different polarity as they exist in the present arrangement, the desired uniform influence of the poles on the rotor and the avoidance of any axial forces results.

Figure 3:
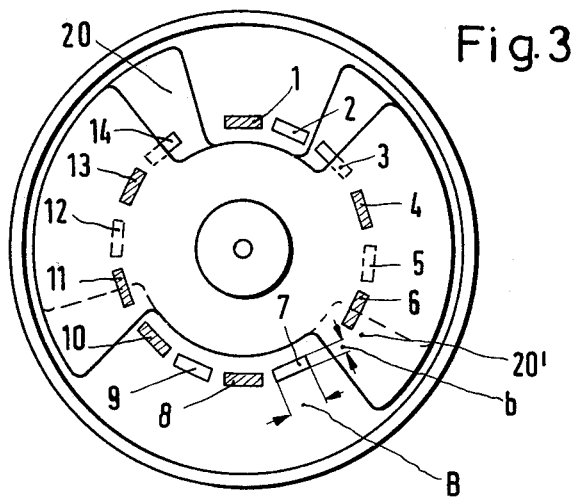
FIG. 3 is a cross-section of the motor according to FIG. 1 illustrating the arrangement and location of the poles.
Figure 4:
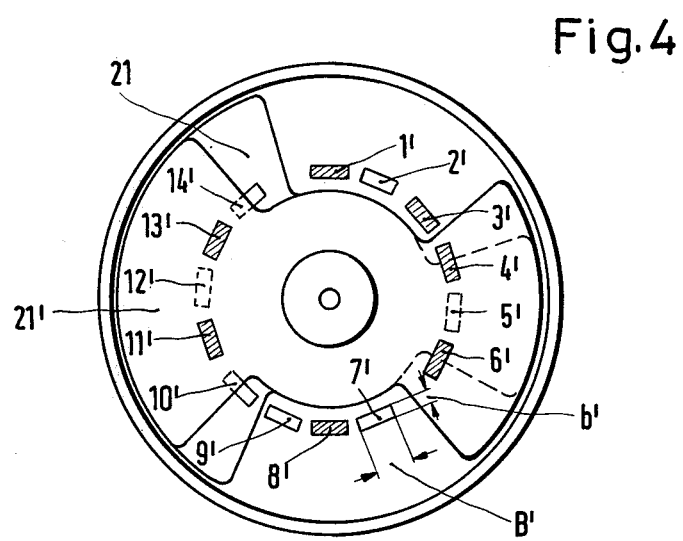
FIG. 4 is a drawing in accordance with FIG. 3 for a further version.

FIG. 3 shows an example of a version of the invention with two main pole groups which consist of the poles 1 and 2 on the one hand and 7, 8, 9 and 10 on the other hand. Both of these main pole groups with two plus four, that is, six poles, are located opposite two auxiliary pole groups, namely, 3 to 6 and 11 to 14, that is, four plus four equaling eight auxiliary poles. The main poles as well as the auxiliary poles 1 to 14 are always bent away like claw poles from the frontal sides which are facing each other, or they are shaped towards the frontal sides where the same number of main poles and the same number of auxiliary poles extend and protrude from each of the two frontal sides. The auxiliary poles of the one frontal side are loaded by means of the short circuiting disc 20, and the auxiliary poles of the opposite frontal side are loaded by means of the short circuiting disc 20'. The auxiliary poles which extend from the one frontal side are, in detail, the auxiliary poles 4, 6, 11 and 13 and the auxiliary poles which extend from the opposite frontal side are the auxiliary poles 3, 5, 12 and 14, whereas the main poles from the first-mentioned frontal side are the main poles 1, 8 and 10 and the main poles from the other frontal side are the main poles 2, 7 and 9. The width of the auxiliary poles as well as the width of the main poles is B and their thickness measured in a radial direction is b. A certain relation is maintained between the width of the pole and the thickness of the pole as well as the inner circumference, on which circumference the poles are arranged. In addition, a certain relation exists also between the outer diameter and the inner diameter of the rotor and its specific gravity in order to achieve a start of the synchronous motor, which start should be as fast as possible. This eventually means nothing else than to keep the moment of inertia of the rotor small and to keep the holding moment of the rotor in the stator also small and to keep the cross-section of the stator poles such that a large sinusoidal-shaped magnetic flux can be preset. The mentioned relationships consist in the fact that the thickness b of the poles is more than 30% of their width B and the relationships consist also of the fact that the effective inner diameter d is larger or equal to the outer diameter D multiplied with the fourth root of a certain amount, which amount includes the specific gravity of the rotor. This relationship is expressed as follows:

$$d \geq D \sqrt[4]{1 - \frac{3}{\gamma}}$$

where $\gamma$ is the specific gravity of the ring-shaped, permanent magnetic rotor. In accordance with this equation, d must always be larger or at least equal to the product of D times the fourth root of 1 minus $3/\gamma$. The accumulated total width of all poles 1 to 14 is at least 60% of the periphery of the circle on which they are located.

The situation which was described above results also for the example of a version of the invention in accordance with FIG. 4. In this example the main pole groups consist of the main poles 1', 2' and 3' and also main poles 7', 8' and 9', and the auxiliary pole groups consist of the auxiliary poles 4', 5' and 6' and also auxiliary poles 10' to 14'. The main poles 1', 3' and 8' are shaped out of the one frontal side and the main poles 2', 7' and 9' are shaped from the other frontal side, whereas the auxiliary poles 4', 6', 11' and 13' are shaped out of the first-mentioned frontal side and the auxiliary poles 5', 10', 12' and 14' are shaped out of the last-mentioned frontal side or they are shaped toward it. Two short circuiting discs 21 and 21' each effect the auxiliary pole groups which extend and protrude from each frontal side. The radial thickness b' and the width B' of each of the main poles and auxiliary poles 1' to 14' corresponds with the thickness and width shown in FIG. 3.

What is claimed is:

1. A self-starting synchronous motor having a defined direction of rotation, a permanent magnetic rotor and a claw-pole type stator, said synchronous motor comprising:

an operating winding having a plurality of poles with several poles being combined to form main pole groups and auxiliary pole groups, said auxiliary pole groups being loaded with short-circuiting discs;

said synchronous motor having a defined direction of rotation which is not preset by means of a directional blockage;

said poles being located on a circular ring and disposed so as to protrude from oppositely located frontal sides of said stator; and said poles being combined to form two main pole groups and two auxiliary pole groups in which the total number of main poles is smaller than the total number of auxiliary poles, an equal number of main poles protrude from each of both of said frontal sides of said stator and an equal number of auxiliary poles protrude from each of both of said frontal sides of said stator.

2. The synchronous motor according to claim 1 wherein the total width of all stator poles amounts to at least 60% of the inner circumference on which they are located.

3. The synchronous motor according to claim 1 wherein the thickness of the stator poles amounts to more than 30% of their width.

4. The synchronous motor according to claim 1 wherein the ring-shaped rotor is made of permanent magnetic material and further wherein the effective inner diameter of the ring-shaped rotor is related to the outside diameter of said rotor in the following way:

$$d \geq D \sqrt[4]{1 - \frac{3}{\gamma}}$$

where $\gamma$ represents the specific gravity of the permanent magnetic material.

* * * * *